(12) United States Patent
Keech et al.

(10) Patent No.: US 6,866,199 B1
(45) Date of Patent: Mar. 15, 2005

(54) METHOD OF LOCATING A CALIBRATION PATCH IN A REFERENCE CALIBRATION TARGET

(75) Inventors: John T. Keech, Penfield, NY (US); John P. Spence, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 597 days.

(21) Appl. No.: 09/636,058

(22) Filed: Aug. 9, 2000

(51) Int. Cl.⁷ .............................................. G06K 19/06
(52) U.S. Cl. ........................................ 235/490; 235/494
(58) Field of Search ................................ 235/490, 492, 235/494, 487, 375, 462.01, 462.09, 462.1, 462

(56) References Cited

U.S. PATENT DOCUMENTS

| | | |
|---|---|---|
| 3,718,074 A | 2/1973 | Davis |
| 4,211,558 A | 7/1980 | Oguchi et al. |
| 4,260,245 A | 4/1981 | Hujer |
| 4,365,882 A | 12/1982 | Disbrow |
| 4,464,045 A | 8/1984 | Findeis et al. |
| 4,577,961 A | 3/1986 | Terashita |
| 4,634,850 A | 1/1987 | Pierce et al. |
| 4,786,792 A | 11/1988 | Pierce et al. |
| 4,874,936 A | 10/1989 | Chandler et al. |
| 4,881,095 A | 11/1989 | Shidara |
| 4,884,102 A | 11/1989 | Terashita |
| 4,939,354 A | 7/1990 | Priddy et al. |
| 5,075,716 A | 12/1991 | Jehan et al. |
| 5,189,521 A | 2/1993 | Ohtsubo et al. |
| 5,198,907 A | 3/1993 | Walker et al. |
| 5,267,030 A | 11/1993 | Giorgianni et al. |
| 5,452,055 A | 9/1995 | Smart |
| 5,519,510 A | 5/1996 | Edgar |
| 5,563,717 A | 10/1996 | Koeng et al. |
| 5,591,956 A | 1/1997 | Longacre, Jr. et al. |
| 5,649,260 A | 7/1997 | Wheeler et al. |
| 5,667,944 A | 9/1997 | Reem et al. |
| 5,698,382 A | 12/1997 | Nakahanada et al. |
| 5,736,996 A | 4/1998 | Takada et al. |
| 5,758,223 A | 5/1998 | Kobayashi et al. |
| 5,767,983 A | 6/1998 | Terashita |
| 5,832,328 A | 11/1998 | Ueda |
| 5,988,896 A | 11/1999 | Edgar |

FOREIGN PATENT DOCUMENTS

| | | |
|---|---|---|
| EP | 0762201 A1 | 3/1997 |
| EP | 0926550 A1 | 6/1999 |
| JP | 11-316448 | 11/1999 |

*Primary Examiner*—Daniel St. Cyr
(74) *Attorney, Agent, or Firm*—Paul A. Leipold; Thomas H. Close

(57) ABSTRACT

A method of locating a reference calibration patch on a photographic element, that includes the steps of: exposing the photographic element to form a latent image of a reference calibration target having a two dimensional barcode symbol with a finder feature and a reference calibration patch having a known spatial relation to the finder feature of the two-dimensional barcode symbol; processing the photographic element to form a density image from the latent image; scanning the density image to produce a digital image; locating the finder feature of the two-dimensional barcode symbol in the digital image; and locating the reference calibration patch relative to the finder feature in the digital image.

31 Claims, 3 Drawing Sheets

METHOD OF LOCATING A CALIBRATION PATCH IN A REFERENCE CALIBRATION TARGET

FIELD OF THE INVENTION

The present invention relates to photography, and more particularly to photographic film having reference calibration patches and data.

BACKGROUND OF THE INVENTION

The use of a sequence of reference calibration patches exposed on a roll of film to enable better exposure control during optical printing is known in the art. See for example U.S. Pat. No. 5,767,983 issued Jun. 16, 1998 to Terashita entitled Color Copying Apparatus for Determining Exposure Amount from Image Data of an Original Image and a Reference Image. The use of calibration patches has also been shown to be useful in determining correction values for scanned film data used in digital printing. See for example U.S. Pat. No. 5,667,944 issued Sep. 16, 1997 to Reem et al. entitled Digital Process Sensitivity Correction; and U.S. Pat. No. 5,649,260, issued Jul. 15, 1997 to Wheeler et al. entitled Automated Photofinishing Apparatus. It is also known to provide barcode data relating to film type and frame number on the edge of film for use in photofinishing.

The reference calibration patches used in these calibration procedures can be neutral, colored or any combination thereof. The neutral patches are created by using approximately equal red, green, and blue actinic exposures. Unfortunately, exposures which produce reference calibration patches that are of low contrast with respect to their background, such as obtained upon development of isolated low exposure areas on a color negative film, are difficult to locate with adequate accuracy in a digital image.

Depending on the application, many scanner types are used in the industry to obtain digital images. A scanner can employ a point sensor to acquire data one pixel at a time from a single, usually small, region of an image at one time and accumulate a full image by two-dimensional relative motion between the sensor and image. A scanner can employ a line array sensor to obtain a full line of pixels at a time and accumulate a two dimensional image by one dimensional relative motion between the sensor and image. A scanner can employ an area array detector and directly acquire a two dimensional image. The transport mechanism to feed a photographic element into a scanner can be one or more of many types, including a manual thrusting or positioning mechanism, a cartridge thrust mechanism, or a high speed continuous feed mechanism. Each class of scanner sensor and transport mechanism can introduce variation in the location and geometry of a digital image relative to the physical image due to variations in alignment, magnification, transport velocity, etc. All these variations make location of patches more difficult.

One solution to the problems of locating reference calibration patches is to additionally print easily identifiable and locatable features onto the photographic element, also called fiducial marks. See U.S. Pat. No. 5,198,907 issued Mar. 30, 1993 to Walker et al. entitled Method and Apparatus for Automatically Locating Predefined Exposure Areas in a Scanned Image which discloses printing an L shaped registration mark having defined lengths relative to an exposure area in a scanner calibration original. The problem with printing such fiducial marks is that they require exposure apparatus and occupy valuable area on the photographic element, area that would preferably be used for additional reference sensitometric patches or other data.

A need remains to provide an improved method for locating sensitometric patches on photographic elements.

SUMMARY OF THE INVENTION

The need is met according to the present invention by providing a method of locating a calibration patch on a photographic element, that includes the steps of: exposing the photographic element to form a latent image of a reference calibration target having a two-dimensional barcode symbol with a finder feature and a calibration patch having a known spatial relation to the finder feature of the two-dimensional barcode symbol; processing the photographic element to form a density image from the latent image; scanning the density image to produce a digital image; locating the finder feature of the two-dimensional barcode symbol in the digital image; and locating the calibration patch relative to the finder feature in the digital image.

ADVANTAGES

The method of the present invention has the advantage that no extra area on the photographic element is occupied by fiducial marks, thereby optimizing the use of the available area, since the standard two-dimensional barcode symbol already includes finding features that enable the reading of the barcode. These finding features are then used for the additional purpose of locating the reference calibration patches according to the present invention.

DETAILED DESCRIPTION OF THE INVENTION

Figure 1:
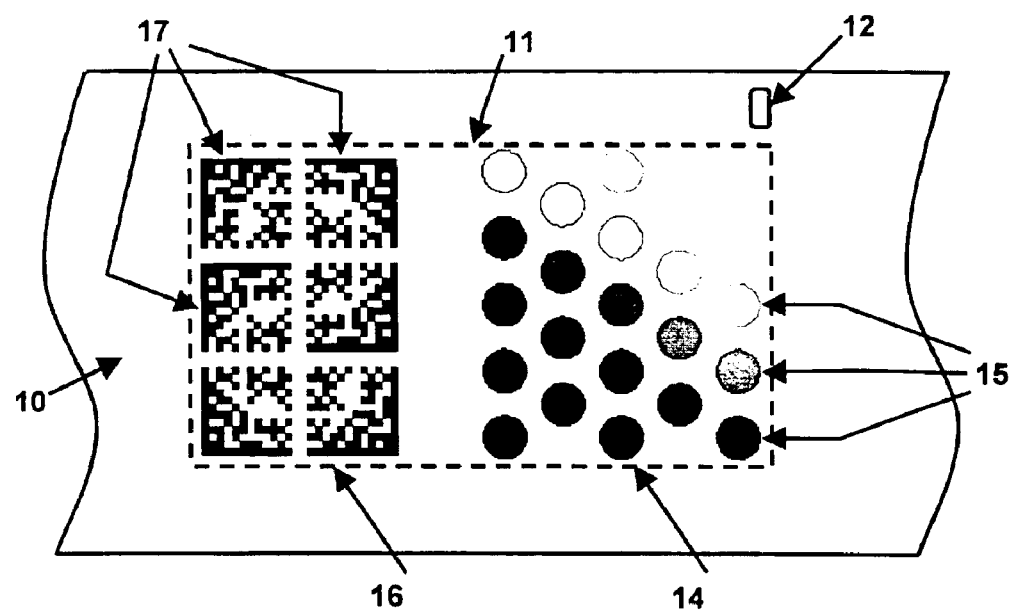
FIG. 1 is a schematic diagram showing a photographic element having a reference calibration target according to the present invention.

An array of reference calibration patches are formed on a photographic element using exposures delivered using any of a variety of exposure modulation devices, preferably using a light source, an integrating chamber, and a fiber optic array with attenuating filters for determining exposure and an imaging head containing an array of lenses and field stops, each fiber exposing one reference calibration patch, as disclosed in copending U.S. Ser. No. 09/635,389, now U.S. Pat. No. 6,407,767 issued Jun. 18, 2002, by Bigelow et al. entitled Apparatus For Exposing Sensitometric And Bar Code Data Onto Photosensitive Media. The number of reference calibration patches in the array is a function of the application. We prefer 23 patches for APS photographic film. A photographic element includes at least a base with a photosensitive layer that is sensitive to light to produce a developable latent image. The photosensitive layer may contain conventional silver halide chemistry, or other photosensitive materials such as thermal or pressure developable chemistries. It can have a transparent base, a reflective base, or a base with a magnetically sensitive coating. The photographic element can be processed through standard chemical processes, including but not limited to Kodak Processes C-41 and its variants, ECN-2, VNF-1, ECP-2 and its variants, D-96, D-97, E-4, E-6, K-14, R-3, and RA-2SM, or RA-4; Fuji Processes CN-16 and its variants, CR-6, CP-43FA, CP-47L, CP-48S, RP-305, RA-4RT; Agfa MSC 100/101/200 Film and Paper Processes, Agfacolor Processes 70, 71, 72 and 94, Agfachrome Processes 44NP and 63; and Konica Processes CNK-4, CPK-2-22, DP, and CRK-2, and Konica ECOJET HQA-N, HQA-F, and HQA-P Processes. The photographic element can be processed using alternate processes such as apparently dry processes that may retain some or all of the developed silver or silver halide in the element or that may include lamination and an appropriate amount of water added to swell the photographic element. Depending upon the design of the photographic element, the photographic element can also be processed using dry processes that may include thermal or high pressure treatment. The processing may also include a combination of apparently dry, dry, and traditional wet processes. Examples of suitable alternate and dry processes include the processes disclosed in: U.S. Ser. No. 60/211,058 filed Jun. 3, 2000 by Levy et al.; 60/211,446 filed Jun. 3, 2000 by Irving et al.; 60/211,065 filed Jun. 3, 2000 by Irving et al.; 60/211,079 filed Jun. 3, 2000 by Irving et al.; EP Patent No. 0762201 A1 published Mar. 12, 1997, by Ishikawa et al., entitled Method of Forming Images, EP Patent No. 0926550A1, published Dec. 12, 1998, by Iwai, et al. entitled Image Information Recording Method; U.S. Pat. No. 5,832,328 issued Nov. 3, 1998 to Ueda entitled Automatic Processing Machine for a Silver Halide Photographic Light-sensitive Material; U.S. Pat. No. 5,758,223 issued May 26, 1998 to Kobayashi, et al. entitled Automatic Processing Machine for Silver Halide Photographic Light-sensitive Material; U.S. Pat. No. 5,698,382 issued Dec. 16, 1997 to Nakahanada, et al. entitled Processing Method for Silver Halide Photographic Light-sensitive Material; U.S. Pat. No. 5,519,510 issued May 21, 1996 to Edgar entitled Electronic Film Development, and U.S. Pat. No. 5,988,896 issued Nov. 23, 1999 to Edgar entitled Method and Apparatus for Electronic Film Development. It is noted that in the processes disclosed by Edgar, development and scanning of the image occur simultaneously. Accordingly, it is the intent of the present invention that any development and scanning steps can be performed simultaneously.

As disclosed in copending application U.S. Ser. No. 09/635,600 by Keech et al. entitled Method And Photographic Element For Calibrating Digital Images, it is useful to store calibration data along with the reference calibration patches exposed onto photographic elements to aid in the calibration process. Such data is preferably stored using two-dimensional barcode symbols optically printed onto the photographic element. The combination of barcode data and reference calibration patches is collectively referred to as a reference calibration target. By placing the reference calibration target into a standard image frame as disclosed in copending application U.S. Ser. No. 09/635,496, now U.S. Pat. No. 6,280,914 issued Aug. 28, 2001, by Keech et al. entitled Photographic Element With Reference Calibration Data, standard photofinishing film scanning apparatus can be used to acquire a digital image of the target. The scanning apparatus can employ a point sensor, a line sensor, or an area array sensor as described above.

Use of two-dimensional barcode symbols to store data is well known in the prior art and many such symbols have been standardized by national and international standards organizations. For example, the Data Matrix symbology, disclosed in U.S. Pat. No. 4,939,354 issued Jul. 3, 1990 to Priddy et al. entitled Dynamically Variable Machine Readable Binary Code and Method for Reading and Producing Thereof, is the subject of the standards ANSI/AIM BC-11-1997 and ISO/IEC 16022:2000. A second such example, the MaxiCode symbology, disclosed in U.S. Pat. No. 4,874,936 issued Oct. 17, 1989 to et al. entitled Hexagonal, Information Encoding Article, Process and System, is the subject of the standards ANSI/AIM BC-10-1997 and ISO/IEC 16023:2000. A third such example, the Aztec Code symbology, disclosed in U.S. Pat. No. 5,591,956 issued Jan. 7, 1997 to Longacre, et al. entitled Two Dimensional Data Encoding Structure and symbology for Use with Optical Readers, is the subject of the standard ANSI/AIM BC-13-1998. Such two-dimensional symbols advantageously contain finding features designed to facilitate location of a symbol in a digital image containing a symbol using automatic procedures. Further, software used to locate such symbols in a digital image is readily available. For example, software for locating and decoding the Data Matrix and MaxiCode symbology is available as the SwiftDecoder™ software product from Omniplanar Inc., Princeton, N.J.

Referring to FIG. 1, a reference calibration target 11 useful with the method of the present invention is shown on a photographic element 10. The reference calibration target 11 includes an array 16 of two-dimensional barcode symbols 17, and an array 14 of reference calibration patches 15. The reference calibration target 11 is located on the photographic element 10 with respect to a perforation 12. Each barcode symbol 17 includes a finding feature that enables a software program to locate and decode the barcode symbol.

Figure 2:
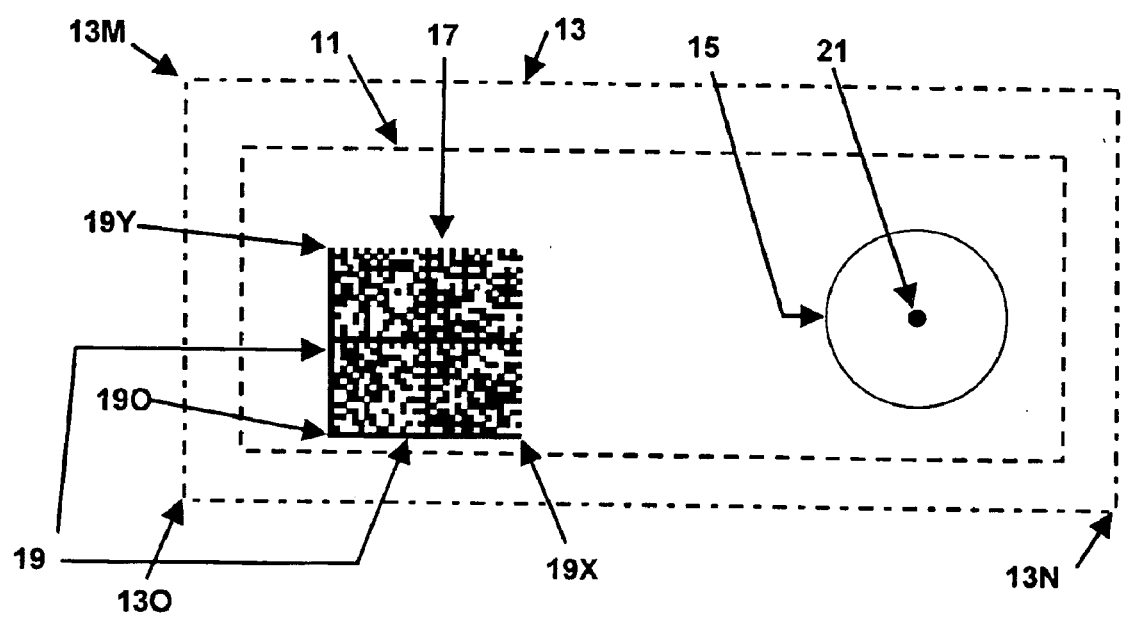
FIG. 2 is a schematic diagram showing a two-dimensional barcode symbol having a finding feature that defines more than one point.

Referring to FIG. 2, a two-dimensional barcode symbol of the type having an L-shaped finding feature 19 (for example the Data Matrix symbology described above) that allows the decoding software to locate at least three reference points 19O, 19X and 19Y at the corners of the barcode symbol 17 is shown. A reference calibration patch 15 with a center location 21 is located at a known location with respect to the finding feature 19 of the two-dimensional barcode symbol 17. The center location 21 can be expressed for example in a Cartesian coordinate system that includes the locations of the three reference points 19O, 19X and 19Y of the two-dimensional barcode symbol 17. The known location 21 may be directly encoded as data in the two-dimensional barcode symbol or stored in an external database (not shown). A digital image area 13 containing the reference calibration target 11 is also shown.

Figure 3:
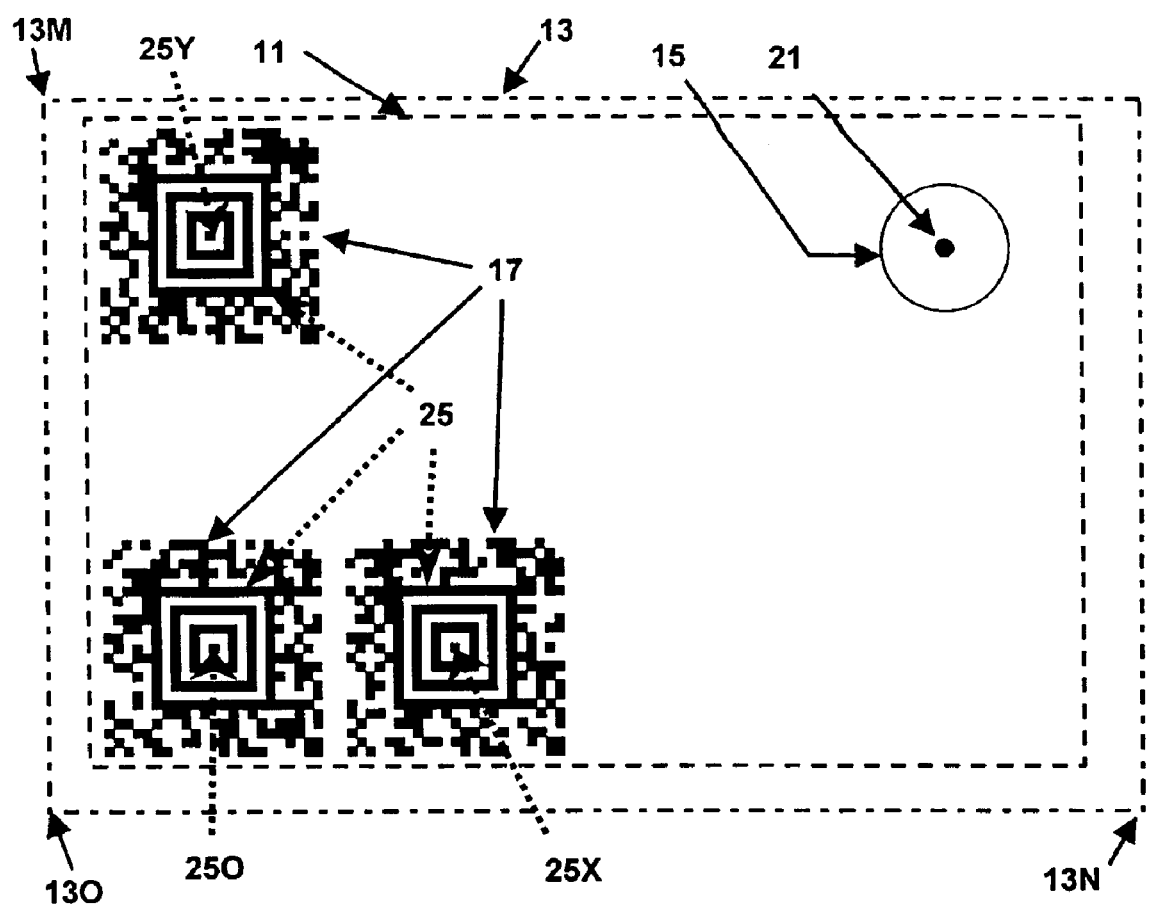
FIG. 3 is a schematic diagram showing a plurality of two-dimensional barcode symbols each having a finding feature that defines a center point.

Referring to FIG. 3, an array of two-dimensional barcode symbols 17 of the type having a center finding feature 25 comprising a set of concentric squares or rings (for example the Aztec symbology as shown or MaxiCode symbologies described above respectively) that allows the decoding software to locate the centers 25O, 25X and 25Y of the corresponding two-dimensional barcode symbols is shown. A reference calibration patch 15 with a center location 21 is located at a known location with respect to the centers 25O, 25X and 25Y of the center finding features 25. The center location 21 can be expressed for example in a Cartesian coordinate system that includes the locations of the centers 25O, 25X and 25Y of the center finding features 25. The known location 21 may be directly encoded as data in the two-dimensional barcode symbol or stored in an external database (not shown). A digital image area 13 containing the reference calibration target 11 is also shown.

Figure 4:
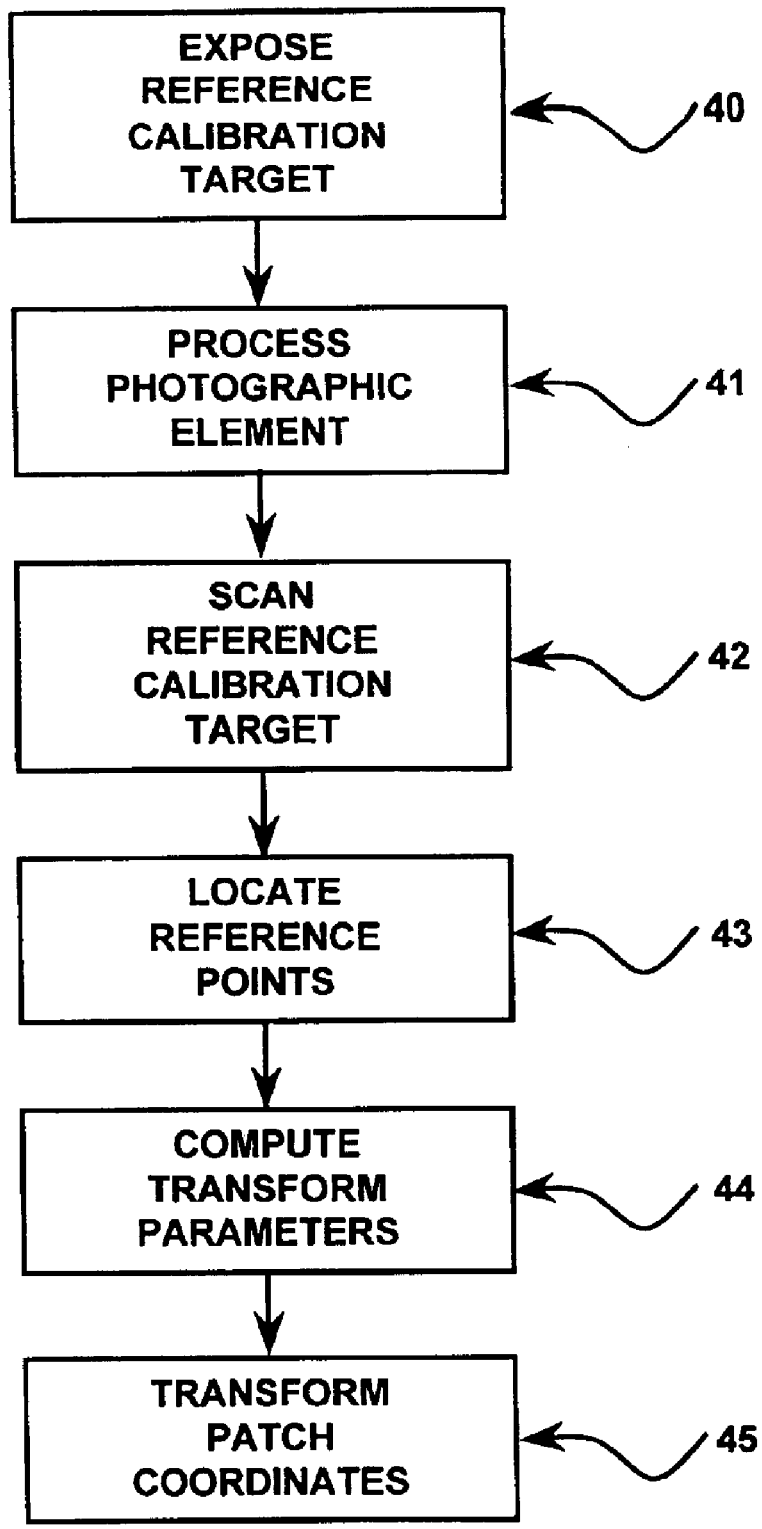
FIG. 4 is a flow chart illustrating the method of the present invention.

Referring to FIG. 4, the method of the present invention includes the step of first exposing (40) the reference calibration target to form a latent image on a photographic element such as a film strip. The reference calibration target can be exposed onto the photographic element during manufacture, or at any time thereafter prior to processing. At a photofinisher, the photographic element is processed (41) to develop a density image of the reference calibration target. The density image of the reference calibration target is then scanned (42) in a conventional scanner to produce a digital image. The two-dimensional barcode symbols are then read from the digital image using conventional two-dimensional barcode reading software and the reference points of the two-dimensional barcode symbols are located (43) within the digital image. The reference calibration patch is located relative to the finder feature in the digital image as follows. Using the located reference points, the parameters of a transformation representing any distortion of the reference calibration target is computed (44). Finally, the reference calibration patch coordinates are transformed (45) using the transformation parameters.

Such a transformation can take many forms, but for the purposes of the present invention, we have found that an affine linear transformation given by the matrix-vector equation $$v = A\ u + b \qquad \text{Eq. 1}$$

wherein u is a two-dimensional vector of coordinates of a point in a first coordinate system, v is a two-dimensional vector of coordinates of the point in a second coordinate system, A is an invertible 2 by 2 matrix, and b is a two-dimensional shift vector, is particularly useful as it can be used to represent a wide variety of distortions that naturally arise in exposing and scanning such as those induced by shifting, scaling, rotation, skew, or combinations thereof. The particular six entries in the matrix A and vector b are parameters of the transformation on that are completely determined by six values taken from the coordinate vectors u and v of three non-collinear points in the first and second coordinate systems respectively.

For example, referring again to FIG. 2, a two-dimensional (x,y) relative coordinate system for the reference calibration target 11 may be defined using the reference point 19O as the origin (0,0), the point 19X as a unit point in the first coordinate (1,0), and the point 19Y as a unit point in the second coordinate (0,1). The known location (xc,yc) of the center point 15 in this relative coordinate system is defined by the geometry of the exposure apparatus used to form the latent image. A two-dimensional (k,l) pixel coordinate system for the digital image 13 formed of 'm' rows and 'n' columns of pixels may be defined using the point 13O as an origin (0,0), the point 13N as a point in the first coordinate (n−1,0), and the point 13M as a point in the second coordinate (0,m−1). The locations of the reference points 19O, 19X, and 19Y found in step (43) of FIG. 4 in this pixel coordinate system are defined as (ko,lo), (kx,lx), and (ky,ly) respectively. The location (k,l) of a point in the pixel coordinate system can be easily computed by applying an affine linear transformation of the form of Eq. 1 to the location (x,y) of the point in the relative coordinate system, with the parameters of this relative-to-physical coordinate transformation given directly in terms of the pixel coordinates of the reference points 19O, 19x, and 19Y, as shown in Eq. 2:

$$\begin{bmatrix} k \\ l \end{bmatrix} = \begin{bmatrix} kx - ko & lx - lo \\ ky - ko & ly - lo \end{bmatrix} \begin{bmatrix} x \\ y \end{bmatrix} + \begin{bmatrix} ko \\ lo \end{bmatrix} \qquad \text{Eq. 2}$$

In particular, the final patch coordinate transformation step (45) of FIG. 4 may be accomplished by transformation of the location (xc,yc) of the center point 15 into pixel coordinates (kc,lc) in the digital image using the transform in Eq. 2.

Referring now to FIG. 3, a two-dimensional (x,y) relative coordinate system for the reference calibration target 11 may be defined using the reference point 25O as the origin (0,0), the point 25X as a unit point in the first coordinate (1,0), and the point 25Y as a unit point in the second coordinate (0,1). The known location (xc,yc) of the center point 15 in this coordinate system is defined by the geometry of the exposure apparatus used to form the latent image and is stored in either the bar code itself, or in an external memory as described previously. A two-dimensional (k,l) pixel coordinate system for the digital image 13 formed of 'm' rows and 'n' columns of pixels may be defined using the point 13O as an origin (0,0), the point 13N as a point in the first coordinate (n−1,0), and the point 13M as a point in the second coordinate (0,m−1). The locations of the reference points 25O, 25X, and 25Y found in step (43) in the pixel coordinate system are again called (ko,lo), (kx,lx), and (ky,ly) respectively, and the location (k,l) of a point in the pixel coordinate system with coordinates (x,y) in the relative coordinate system can again be computed using Eq. 2. Again, the final step (45) of FIG. 4 may be accomplished by transformation of the location (xc,yc) of the center point 15 into pixel coordinates (kc,lc) in the digital image using the transform in Eq. 2.

More generally, rather than using a relative coordinate system based on the locations of three reference points within the reference calibration target 11 such as 19O, 19X, and 19Y in FIG. 2, or 25O, 25X, and 25Y in FIG. 3 respectively, to define a basic coordinate system for the reference calibration target, a physical two-dimensional coordinate system is used to locate points within the reference calibration target 11. Such a physical coordinate system can be based on physical features of the photographic element, for example, the location of a reference perforation 12 (see FIG. 1) and the edge of the photographic element 10 nearest the perforation, the axis directions being determined by the length and width of the film strip and being measured in convenient units. The procedure outlined in the above discussion of FIGS. 2 and 3 can be used to define a second affine linear transformation of the form of Eq. 1, this time using given locations of the same three non-collinear reference points in the physical coordinate system, to obtain the transform parameters for a relative-to-physical coordinate transformation. This relative-to-physical coordinate transformation can be inverted using well known methods of linear algebra to form a physical-to-relative coordinate transformation, which is also an affine linear transformation of the form of Eq. 1. By applying the physical-to-relative and relative-to-pixel coordinate transformations in seriatim, locations specified in physical coordinates are transformed into pixel coordinates. The physical-to-pixel coordinate transformation obtained by such successive application of affine linear transformations is itself an affine linear transformation with parameters computed from the parameters of the individual transformations using well-known methods of linear algebra.

In a dedicated system with excellent control of digital image size and orientation relative to physical image size and orientation, the physical coordinate system can conveniently be defined in units commensurate with digital image pixels and aligned to share coordinate directions with the digital image coordinate directions. In such a case, the physical-to-pixel coordinate transformation takes the form of a pure translation, with the matrix A in Eq. 1 being an identity matrix and the only free parameters being the two entries in the shift vector b in Eq. 1. These parameters of this transform are completely determined by physical and pixel coordinates of a single point. The computation in step (44) of FIG. 4 becomes subtraction of physical coordinates from pixel coordinates.

In a dedicated system with excellent control of digital image orientation relative to physical image orientation, the physical coordinate system can conveniently be aligned to share coordinate directions with the digital image coordinate directions. In such a case, the physical-to-pixel coordinate transformation takes the form of a translation and scaling transform, with the matrix A in Eq. 1 being a diagonal matrix with two free parameters and the shift vector b in Eq. 1 comprising two additional free parameters. These four parameters are completely determined by the physical and pixel coordinates of two points that do not share a common coordinate value in either coordinate system. The parameter computation in step (44) of FIG. 4 becomes subtraction of physical coordinates from pixel coordinates of either point and forming the ratios of pixel coordinate differences and physical coordinate differences between the two points.

Further, use of locations of more than the minimum required number of reference points to obtain parameters in step (44) of FIG. 4 using well-known methods such as ordinary least squares, can be advantageous in the presence of naturally arising uncertainty in locations in a digital image.

The invention has been described in detail with particular reference to certain preferred embodiments thereof, but it will be understood that variations and modifications can be effected within the spirit and scope of the invention.

Parts List 10 photographic element
11 reference calibration target
12 perforation
13 digital image area
13O corner of digital image area
13M corner of digital image area
13N corner of digital image area
14 reference calibration patch array
15 reference calibration patch
16 barcode symbol array
17 two-dimensional barcode symbol
19 finding feature
19O corner of barcode symbol
19X corner of barcode symbol
19Y corner of barcode symbol
21 reference calibration patch center location
25 bar code symbol center finder feature
25O barcode symbol center
25X barcode symbol center
25Y barcode symbol center
40 exposing step
41 processing step
42 scanning step
43 barcode symbol location step
44 transform parameter computing step
45 coordinate transformation step

What is claimed is:

1. A method of locating a reference calibration patch on a photographic element, comprising the steps of:

a) exposing the photographic element to form a latent image of a reference calibration patch having a two-dimensional barcode symbol with a finder feature and a known spatial relation between the reference calibration patch and the finder feature of the two-dimensional barcode symbol;

b) processing the photographic element to form a density image from the latent image;

c) scanning the density image to produce a digital image;

d) locating the finder feature of the two-dimensional barcode in the digital image; and e) locating the reference calibration patch relative to the finder feature in the digital image wherein the known spatial relation is the location of the center of the reference calibration patch.

2. The method claimed in claim 1, wherein the finding feature of the two-dimensional barcode symbol locates the corners of the two-dimensional barcode symbol and further comprising the steps of:

a) calculating a transformation representing a spatial distortion of the calibration target; and b) using the transformation to locate the calibration patch.

3. The method claimed in claim 2, wherein the transformation is an affine linear transformation.

4. The method claimed in claim 3, wherein the affine linear transformation is a translation and a scaling.

5. The method claimed in claim 3, wherein the affine linear transformation is a translation.

6. The method claimed in claim 1, wherein the finding feature of the two-dimensional barcode symbol locates the center of the two-dimensional barcode symbol.

7. The method claimed in claim 1, wherein the reference calibration target comprises an array of two-dimensional barcode symbols and further comprising the steps of:

a) calculating a transformation representing the spatial distortion of the calibration patch; and b) using the transformation to locate the reference calibration patch.

8. The method claimed in claim 7, wherein the transformation is a translation.

9. The method claimed in claim 7, wherein the transformation is a translation and a scaling and the number of two-dimensional barcode symbols in the array is two or more.

10. The method claimed in claim 7, wherein the transformation is an affine linear transformation and the number of two-dimensional barcode symbols in the array is three or more.

11. The method claimed in claim 1, wherein the photographic element is a film strip.

12. The method claimed in claim 1, wherein the processing step employs a standard photographic process.

13. The method claimed in claim 1, wherein the processing step employs an alternate photographic process.

14. The method claimed in claim 1, wherein the processing step employs a dry photographic process.

15. The method claimed in claim 14, wherein the dry photographic process includes high-pressure treatment.

16. The method claimed in claim 14, wherein the dry photographic process includes thermal treatment.

17. The method claimed in claim 1, wherein the scanning step employs an area array sensor.

18. The method claimed in claim 1, wherein the scanning step employs a linear array sensor.

19. The method claimed in claim 1, wherein the scanning step employs a point sensor.

20. The method claimed in claim 1, wherein the location of the reference calibration patch relative to the finder feature is stored in the two-dimensional barcode symbol.

21. The method claimed in claim 1, wherein the location of the reference calibration patch relative to the finder feature is stored in a database.

22. A photographic element, comprising:
   a) a base;
   b) a photosensitive layer on the base; and
   c) a latent image in the light sensitive layer of a reference calibration target having a reference calibration patch and a two-dimensional barcode symbol with a finder feature having a known spatial relation between the reference calibration patch and the finder feature of the two-dimensional barcode symbol, wherein the known spatial relation is the location of the center of the reference calibration patch.

23. The photographic element claimed in claim 22, wherein the finding feature of the two-dimensional barcode symbol locates the corners of the two-dimensional barcode symbol.

24. The photographic element claimed in claim 22, wherein the finding feature of the two-dimensional barcode symbol locates the center of the two-dimensional barcode symbol.

25. The photographic element claimed in claim 22, wherein the reference calibration target comprises an array of two-dimensional barcode symbols.

26. The photographic element claimed in claim 22, wherein the photographic element is a film strip.

27. The photographic element claimed in claim 22, wherein the photosensitive layer contains conventional silver halide chemistry.

28. The photographic element claimed in claim 22, wherein the photosensitive layer contains thermal developable chemistry.

29. The photographic element claimed in claim 22, wherein the photosensitive layer contains pressure developable chemistry.

30. The photographic element claimed in claim 22, wherein the location of the reference calibration patch relative to the finder feature is stored in the two-dimensional barcode symbol.

31. The photographic element claimed in claim 22, wherein the photographic element is an APS (Advanced Photographic System) film strip, and the reference calibration target includes 23 reference calibration patches and 6 two-dimensional barcode symbols.

* * * * *